United States Patent [19]

Elliff

[11] Patent Number: 4,729,776

[45] Date of Patent: Mar. 8, 1988

[54] AIR SWIRLING DEVICE FOR USE IN THE ANNULAR SPACE OF AIR FILTERS ON INTERNAL COMBUSTION ENGINES

[76] Inventor: Howard E. Elliff, 14126 Carneswood, Tomball, Tex. 77375

[21] Appl. No.: 12,687

[22] Filed: Feb. 9, 1987

[51] Int. Cl.[4] .................. B01D 45/12

[52] U.S. Cl. .................. 55/455; 55/337; 55/510; 123/592

[58] Field of Search .................. 55/337, 452, 455, 510, 55/DIG. 28; 123/590, 592

[56] References Cited

U.S. PATENT DOCUMENTS

| | | | |
|---|---|---|---|
| 2,544,395 | 3/1951 | Polk | 55/455 |
| 3,877,907 | 4/1975 | Elliff | 55/510 |

FOREIGN PATENT DOCUMENTS

| | | | |
|---|---|---|---|
| 5655 | 1/1928 | Australia | 55/337 |
| 896609 | 5/1944 | France | 55/337 |

*Primary Examiner*—Bernard Nozick

*Attorney, Agent, or Firm*—James A. Bargfrede

[57] ABSTRACT

A substantially circular strip air swirling device is provided for positioning in the annular space of air filters on internal combustion engines. Such device has a plurality of upper outwardly extending vanes and a plurality of upper inwardly extruding vanes with a transverse support member. Such device creates a swirling stream of air as the air enters the air horn of the carburetor to provide improved carburetion which results in improved gasoline mileage.

1 Claim, 4 Drawing Figures

AIR SWIRLING DEVICE FOR USE IN THE ANNULAR SPACE OF AIR FILTERS ON INTERNAL COMBUSTION ENGINES

SUMMARY OF THE INVENTION

A device is provided for use inside the air filter of an internal combustion engine between the filter and the air horn of the carburetor, such device having a plurality of vanes extending outwardly from the circular framework and also a plurality of vanes extending inwardly as close to the air horn as possible without interferring with any moving part. The outwardly extending vanes direct the air into a swirling stream as it enters the air horn or ventura of the carburetor. The stream of air travels under the influence of the vacuum for a longer period of time and, therefore, increases greatly in speed. The swirling mixture is also influenced by the inwardly turned vanes which are positioned at an angle of about 20 to 30 degrees from the transverse support member and the air is deflected into a downward and swirling manner in which it is readily accepted into the vacuum of the system.

DETAILED DESCRIPTION

Figure 1:
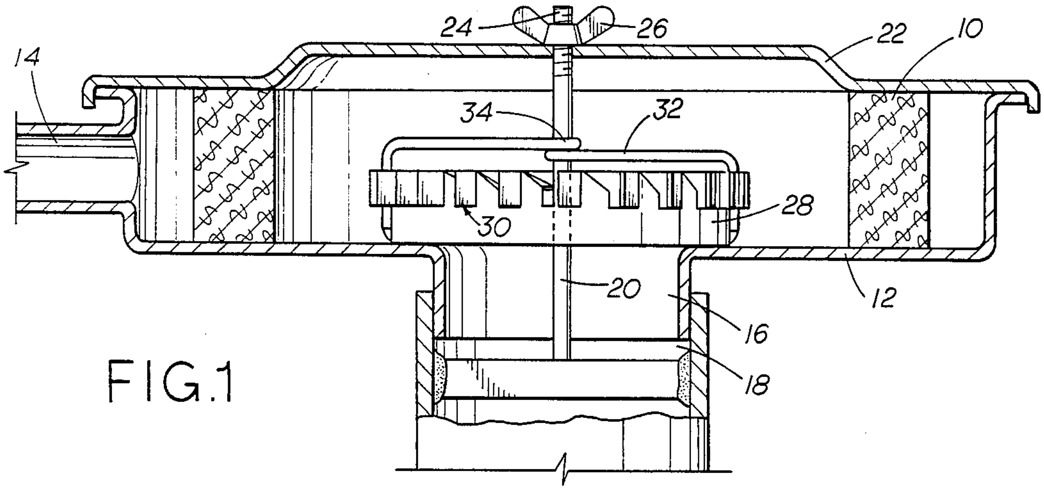
FIG. 1 is a partial sectional, elevational view showing the device of the present invention positioned in an air filter housing.

FIG. 1 is a partial sectional, elevational view showing a conventional, circular air filter 10 positioned in housing 12 having an air intake opening 14 and an air horn 16 which goes to the carburetor (not shown) of an internal combustion engine. A bolt support member 18 has bolt 20 attached thereto and extends upwardly through cover 22. A threaded upper portion 24 of bolt 20 has a wing nut 26 threadedly coupled thereto to position cover 22 on housing 12.

Positioned around bolt 20 and resting on the inside of housing 12 is the device of the present invention, such device including a circular strip frame 28 having a plurality of vanes such as vane 30 on the upper portion of frame 28. A transverse member 32 is rigidly connected to frame 28 and has an opening for positioning around bolt 20.

The device of the present invention provides improved carburetion as will be explained subsequently in detail.

Figure 2:
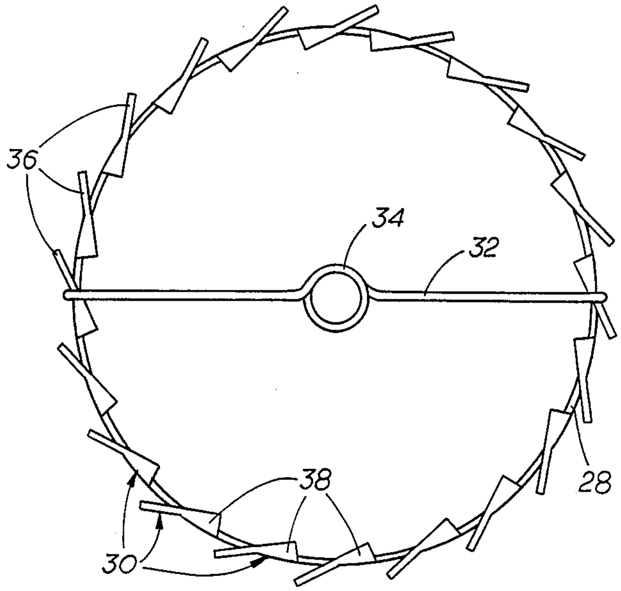
FIG. 2 is a top plan view of the device of the present invention.

FIG. 2 is a top plan view of the device of the present invention. Circular strip frame 28 has transvere member 32 extending over and outside such circular strip frame 28 and has opening 34 for positioning on the bolt 20 shown in FIG. 1. A plurality of vanes such as vane 30 extend outwardly and inwardly from circular strip frame 28.

Figure 3:
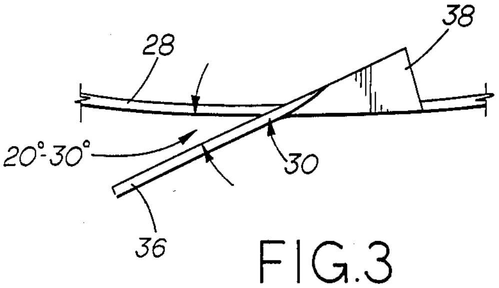
FIG. 3 is an enlarged top plan view of a vane portion of the device of the present invention.

FIG. 3 is an enlarged top plan view of the vane 30 shown in FIG. 2. An outer portion 36 extends outwardly from frame 28 and an inner portion 38 extends inwardly from frame 28. The angle between frame 28 and outer portion is between 20 and 30 degrees.

Figure 4:
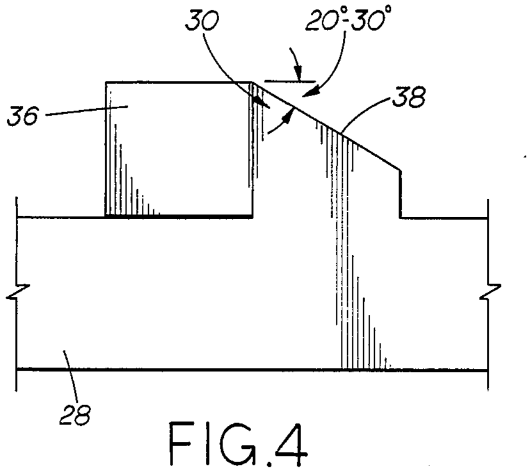
FIG. 4 is an enlarged, elevational view of a vane portion of the device of the present invention.

FIG. 4 is an enlarged, elevational view of the vane 30 portion of the device of the present invention. Vane 30 is positioned on the upper part of the circular frame 28 and vane 30 has outer portion 36 and inner portion 38. Inner portion 38 is at an angle of 20 to 30 degrees with respect to a horizontal plane.

The device of the present invention enhances the following three important features of good carburetion:

(1) Speed of air which is swirled and turned in such a manner that the air enters the carburetion system in a more orderly manner than tumbling in a disorderly mass, therefore allowing more air to enter the carburetor in a given period of time.

(2) The mixture of air and fuel is a very important principle of good carburetion and the device of the present invention allows the swirling air to receive the fuel and mix the fuel and air thoroughly.

(3) Another important part of good carburetion is the injection of heat into the air-fuel mixture which is accomplished with the device of the present invention by the air-fuel mixture hitting the heat exchanges of the engine with a higher speed and greater force and a greatly enhanced mixture so that better vaporization is achieved.

My prior U.S. Pat. No. 3,877,907 issued Apr. 15, 1975 and entitled "Air Swirling Unit For Air Filters On Internal Combustion Engines" disclosed a device which was cumbersome, expensive to manufacture, and did not achieve the improved results provided by the device of my present invention. The device of my present invention may be mass produced for the most part at a reasonable price and is also more efficient because of its nearness to the carburetor thereby minimizing loss in transmission of the air-fuel mixture to the intake manifold of the engine.

The device of the present invention is simple, efficient, reliable, inexpensive, and easy to install without the need for the special tools.

I claim:

1. A device for use in the annular space of an air filter positioned in an air filter housing having an inlet and an outlet, said device including in combination a circular strip frame, a plurality of outwardly extending vanes extending from the upper portion of said frame at an angle from about 20 to 30 degrees, a plurality of inwardly extending vanes extending from the upper portion of said frame at an angle from about 20 to 30 degrees with respect to a horizontal plane, and a transverse support member connected to the outer portion of said frame, said transverse support member having an opening therein.

* * * * *